United States Patent [19]

Raehse et al.

[11] Patent Number: 4,963,271
[45] Date of Patent: Oct. 16, 1990

[54] PROCESS FOR THE SEPARATION AND PURIFICATION OF CELLULOSE ETHERS AND CELLULOSE DERIVATIVES

[75] Inventors: Wilfried Raehse, Duesseldorf; Willi Wuest, Ratingen; Norbert Kuehne, Haan, all of Fed. Rep. of Germany

[73] Assignee: Henkel Kommanditgesellschaft auf Aktien, Duesseldorf, Fed. Rep. of Germany

[21] Appl. No.: 238,687

[22] Filed: Aug. 31, 1988

[30] Foreign Application Priority Data

Sep. 2, 1987 [DE] Fed. Rep. of Germany ....... 3729268

[51] Int. Cl.$^5$ .............................................. B01D 37/04
[52] U.S. Cl. ..................................... 210/772; 210/797; 210/806
[58] Field of Search .................... 210/767, 333.01, 332, 210/334, 386, 346, 486, 771, 772, 791, 797, 806

[56] References Cited

U.S. PATENT DOCUMENTS 4,152,267 5/1979 Davis et al. ......................... 210/331
4,789,474 12/1988 Gaudfrin ........................ 210/333.01
4,790,935 12/1988 Johnson ............................. 210/331

FOREIGN PATENT DOCUMENTS 3044696 6/1982 Fed. Rep. of Germany .

OTHER PUBLICATIONS

Ullmans Encyklopdie der technischen Chemie, 4. Auflage, Band 2, Verfahrenstechnik I, 1972, pp. 177–178.
Chem. Ing. Techn. 55, 1983, Nr. 11, pp. 823–829 and 829–839.

Primary Examiner—Richard V. Fisher
Assistant Examiner—Wanda L. Millard
Attorney, Agent, or Firm—Ernest G. Szoke; Wayne C. Jaeschke; Real J. Grandmaison

[57] ABSTRACT

A process and apparatus for the separation and purification of cellulose ethers and other cellulose derivatives in a filter unit at relatively high temperatures and with narrow-mesh filters, employing a pressure vessel having candle filters to which pressure is introduced for separation of the suspension liquid, for the removal of residual liquid from the filter cake formed, and also for washing the filter cake.

15 Claims, 1 Drawing Sheet

1

PROCESS FOR THE SEPARATION AND PURIFICATION OF CELLULOSE ETHERS AND CELLULOSE DERIVATIVES

BACKGROUND OF THE INVENTION

1. Field of the Invention

This invention relates to a process and apparatus for the separation and purification of cellulose ethers and other cellulose derivatives in a filter unit.

2. Discussion of Related Art

Processes for the purification of cellulose ethers are known in which a solid/liquid separation takes place in centrifuges or vacuum filters. In these known processes, the screen aperture widths or the cloth mesh widths must not be below certain values for mechanical reasons. At the same time, the purification process cannot be carried out under the safety of an inert gas blanket, for example of nitrogen, as is desirable where solvents are used. In addition, there is a temperature limit of about 100° C. in known processes for the purification of methyl cellulose derivatives because a vacuum has to be applied in processes using a band filter or because cooling takes place in processes using centrifuges on account of the circulation of air. Known processes also have a relatively large space requirement.

Accordingly, an object of the present invention is to overcome the disadvantages of the prior art and to provide a solution which enables all cellulose ethers and other cellulose derivatives to be separated and purified, even at relatively high temperatures, and also provide for the use of narrow-mesh filters.

DESCRIPTION OF THE INVENTION

Other than in the operating examples, or where otherwise indicated, all numbers expressing quantities of ingredients or reaction conditions used herein are to be understood as modified in all instances by the term "about".

In a process of the afore-mentioned type, this object is achieved in accordance with the invention wherein a pressure vessel with candle filters, to which pressure is introduced, is used for separation of the suspension liquid, for the removal of residual liquid from the filter cake formed, and also for washing the filter cake.

In one embodiment of the invention, a suspension containing the product to be filtered is fed to a pressure vessel equipped with candle filters, steam or gas pressure is introduced to the pressure vessel, the filtrate obtained at the candle filters is conducted from the pressure vessel into a filtrate pipe and the residual mother liquor or suspension is removed from the pressure vessel, after which a washing liquid is fed to the pressure vessel, optionally subjected to steam or gas pressure and forced through the filter cake on the candle filters into the filtrate pipe and the residual washing liquid removed from the pressure vessel, after which steam or gas pressure is again introduced to the pressure vessel and, to remove water from the filter cake, this medium is passed through the filter cake into the filtrate pipe and, finally, the filter cake is removed from the candle filters by admission of steam or gas on the filtrate pipe side and the filter cake is removed from the pressure vessel.

The process according to the invention is flexible in its application and is therefore eminently suitable for working up all cellulose ethers and derivatives thereof and, more especially, for the working up of thermoplastic hydroxypropyl celluloses because the filter cake being deposited or the deposited filter cake is not subjected to any significant mechanical stress. In addition, product losses are considerably reduced by the process according to the invention and long useful lives are obtained for the filter unit. By virtue of the reduced product losses, the COD value of the wastewater is also considerably reduced so that, overall, considerable ecological and economical advantages are obtained.

In the process according to the invention, a temperature of from 15° to 130° C. may readily be established in the pressure vessel and an inert gas, for example nitrogen, may be introduced thereto. In addition, filter cloths having a mesh width of less than 100 $\mu$m and more especially from 10 to 30 $\mu$m may be used, and the filter cloths may be back-washed under a pressure of from about 1 to 5 bar. In addition, methyl cellulose derivatives having high flocculation points may be treated by the process according to the invention. Finally, the process according to the invention is also distinguished by a minimal space requirement.

Further advantages and particulars will be apparent from the following disclosure.

In an apparatus of the type mentioned herein, the problem on which the invention is based is solved by a pressure vessel having several candle filters, a filler pipe for the suspension, washing liquid and steam, a filtrate pipe with facilities for the introduction of nitrogen, air, steam and water, a feed pipe for gases and an overflow. Using the apparatus according to the invention, it is possible to carry out the process of which the advantages have already been described in the foregoing.

BRIEF DESCRIPTION OF THE DRAWING

One embodiment of the invention is described in detail in the following with reference to the accompanying drawing wherein.

DETAILED DESCRIPTION OF THE DRAWING

Figure 1:
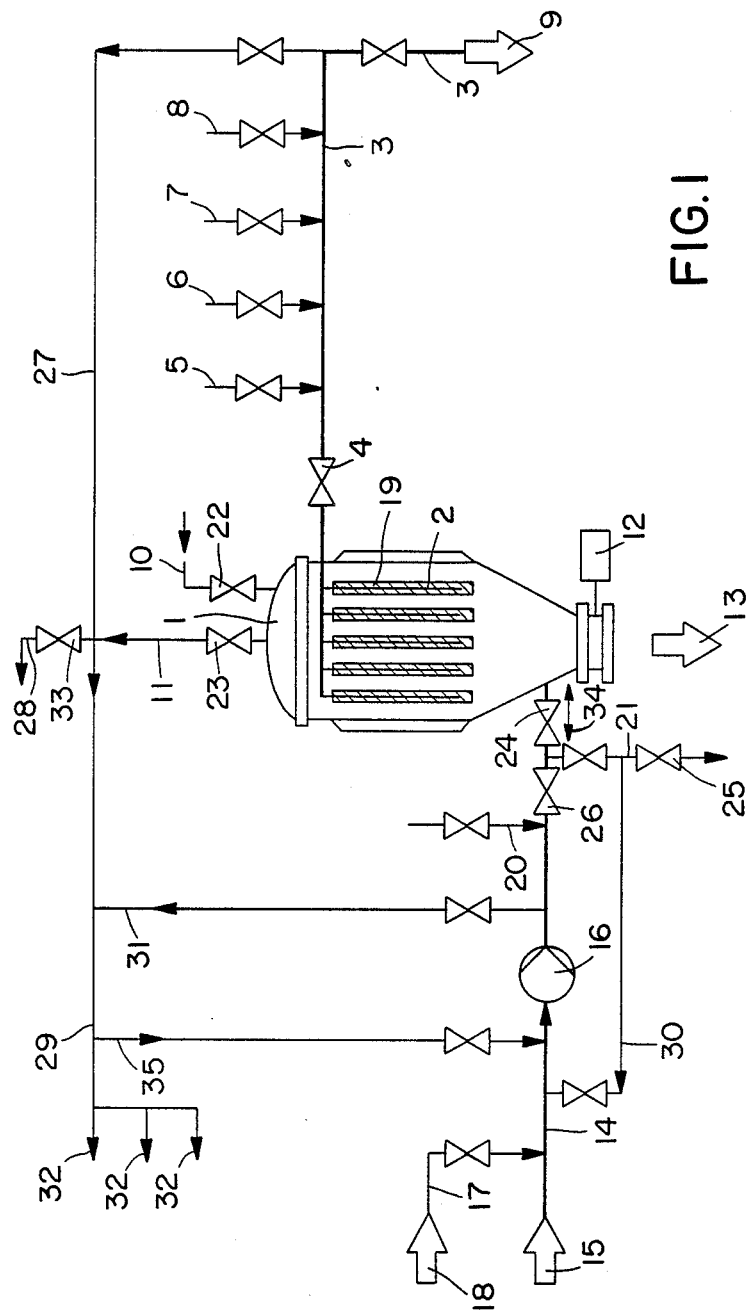
FIG. 1 is a basic diagram of an apparatus according to the invention.

FIG. 1 shows a pressure vessel 1 with five candle filters 2 arranged therein. In the illustrated embodiment, the candle filters are covered by a monofilament polyvinylidene fluoride filter cloth having a mesh width of 30 $\mu$m. Overall, the filter unit consisting of these candle filters 2 has a filter surface of 0.31 m² for a useful volume of 15.7 1. The risers of the candle filters 2 are connected to a filtrate pipe 3 which leads out from the pressure vessel 1, a valve 4 being arranged in the filtrate pipe 3 just outside the pressure vessel 1. Further along the filtrate pipe 3, inlets are provided for nitrogen 5, air 6, steam 7 and water 8 for back washing the filter cloth. The filtrate obtained at the candle filters 2 flows through the filtrate pipe 3 in the direction of the arrow 9 to units for its subsequent use. However, the filtrate may also be branched off from the filtrate pipe 3 and fed to a pipe 27 through which it enters a pipe 17 and is then returned through a feed pipe 14 to the pressure vessel 1.

A pipe 10 for the introduction of nitrogen, air or steam into the pressure vessel and an overflow 11 are arranged in the head portion of the pressure vessel 1. From the overflow 11, the suspension issuing therefrom can be introduced into a discharge pipe 28 or, for recycling, into a pipe 29 from which receiving vessels (not shown) for the suspension, filtrate and washing water can be reached through a distributor 32.

In addition, the pressure vessel 1 is provided in its base portion with a slide 12 through which the base section can be opened and the filter cake obtained in the course of filtration removed from the pressure vessel in the direction of the arrow 13. Also, the feed pipe 14 opens at the base portion of the pressure vessel 1, the suspension to be prepared being delivered to the feed pipe 14 in the direction of the arrow 15 for introduction into the pressure vessel 1. A rotary pump 16 is arranged in the pipe 14 for the transport of the suspension and the other liquids introduced, if any. In addition, a washing liquid may also be delivered to the pipe 14 through the pipe 17 in the direction of the arrow 18 for cleaning the filter cake 19 which has formed during filtration at the filter candles 2. In addition, a pipe 20, through which steam can be delivered to the pipe 14 and to the pressure vessel 1, opens into the pipe 14. For discharging excess suspension or excess washing liquid from the pressure vessel 1, the pipe 14 is connected to a discharge pipe 21. Accordingly, liquid can flow through the pipe 14 from two sides in the vicinity of the valve 24 to the branch of the discharge pipe 21, which is intended to be indicated by the double arrow 34. In addition, a pipe 30 branches off from the discharge pipe 21, opening into the pipe 14 on the suction side of the pump 16. Through the pipe 30, excess suspension or washing liquid can be returned from the pressure vessel 1 into the pipe 14 and from there via the pump 16 through the pipes 31 and 29 and through the distributor 32 into the receiving vessels which are not shown.

To carry out the process according to the invention, a cellulose suspension is first delivered to the pressure vessel 1 through the pipe 14 in the direction of the arrow 15. Until the pressure vessel 1 is completely full, the valves 4 and 22 remain closed and the valves 23, 24 and 33 are open. The valves 23, 24 and 33 are then closed and the valve 4 opened. If the pressure prevailing in the pressure vessel 1 is not sufficient for forcing out the liquid through the candle filters into filtrate pipe 3, the valve 22 is opened and air, nitrogen or steam introduced under the necessary pressure through the pipe 10. The filter cake 19 then forms at the candle filters in the course of the filtration which now takes place. To empty the residual mother liquor left after filtration from the pressure vessel, the valve 4 is then closed and the valve 24 opened (with valve 26 closed), so that the residual mother liquor can enter the pipe 21. With the valve 25 open, the mother liquor is then discharged or, with the valve 25 closed, is conducted into the pipe 30. The pressure required for emptying is again generated by the introduction of nitrogen, air or steam through the pipe 10. Thereafter, the valve 4 is re-opened so that residues of mother liquor can be forced out from the filter cake. After this filtration cycle for separation of the prepared cellulose ethers or other derivatives, the pressure vessel 1 is filled with a washing liquid, for example water or an alcohol/water mixture, through the pipes 17 and 14 (arrow 18) for washing the filter cake. This washing liquid is forced through the filter cake into the filtrate pipe 3 by admission of air or nitrogen under pressure to the vessel 1 through the pipe 10 or by admission of steam under pressure through the pipes 20 and 14. Any residues of washing liquid collecting at the bottom of the pressure vessel 1 are then forced into the pipes 14 and 21 (valve 4 closed). The liquid may also be returned to the pipe 29 through the pipes 30, 14 and 31. After this wash cycle, the filter cake 19 may be further freed from water by the re-introduction of hot air or nitrogen through the pipe 10 or even steam (valve 4 open). Thereafter, nitrogen (pipe 5) at a temperature of 15° to 30° C. or air (pipe 6) at a temperature of 100° to 120° C. is applied to the filter cloth from the filtrate pipe side, a brief pressure surge optionally applied and hence the filter cake 19 blown off from the candle filters 2. After opening of the slide 12, the filter cake is removed from the bottom of the pressure vessel 1 in the direction of the arrow 13. The filter cloths may also be cleaned by backwashing, for which purpose the backwashing media nitrogen 5, air 6, steam 7 or water 8 are introduced into the filtrate pipe 3 through the pipes 5, 6, 7 or 8 and applied to the filter cloths from the rear.

Alternatively, the following procedure may also be effectively adopted for filling the vessel 1 with suspension and for carrying out the filtration:

By means of the pump 16, the container 1 is about half-filled with suspension introduced through the pipe 14 in the direction of the arrow 15 (valve 4 closed). Filtrate liquid from the previous batch which is kept in a container (not shown) behind the distributor pipe 32 is then pumped through the pipes 17, 14 into the pressure vessel 1 until the pressure vessel is completely full. The valve 4 is then opened and the filtrate obtained is circulated through the vessel 1 via the pipes 3, 27, 29, 35, 14 until the solids adhere completely and uniformly to the candle filters 2 in the form of a filter cake 19. The intersticial water is then forced out, followed by one or two washes carried out as described in the foregoing.

Cellulose ethers, cellulose mixed ethers and cellulose derivatives may be continuously or intermittently separated and purified in the pressure filter apparatus described in the foregoing. In each case, an excess pressure of from about 1 to 3 bar is built up in the pressure vessel 1 both during the separation step, in which the filter cake settles on the filter candles, and in the cleaning step with the washing water. Methyl celluloses and hydroxypropyl celluloses and the mixed ether (ester) derivatives are purified with water at a temperature of 90° to 130° C., or an alcohol/water mixture at a temperature of 15° to 60° C., the alcohol used being, for example, methanol, ethanol, isopropanol and t-butanol or a ketone used being acetone or methyl ethyl ketone. In these cases, an inert atmosphere is established in the pressure vessel 1, for example by the introduction of nitrogen through the pipe 10, and the excess pressure is built up by the gas thus introduced.

Two examples of process cycles are given in the following:

Example I

A methyl hydroxyethyl cellulose (MHEC) which, in purified form, has the following characteristic data:

| | |
|---|---|
| Brookfield viscosity, 2% stirred mixture (MHEC pure, bone dry; measurement temperature 20.0° C.) | 28,500 mPa.s |
| Degrees of substitution: | 22.0% |
| OCH$_3$ content | |
| EOOH content | 9.1% |
| Flocculation point | 93° C. | was mashed in a ratio of MHEC (pure, bone dry) to water of 1:15 under excess pressure at 115° C. in a pressure-tight stirred vessel and then pumped through the pipe 14 in the direction of the arrow 15 into the pressure vessel 1. The filtrate discharge valve 4 was closed, the temperature in the pressure vessel 1 was 115° C., corresponding to a pressure inside the vessel of 1.7 bar.

After the pressure vessel 1 had been completely filled with the MHEC suspension, the valves 23 and 33 of the overflow 11 were closed and the valve 4 in the filtrate pipe 3 opened so that a pressure of 1.4 bar prevailed ahead of the valve. On completion of filtration, the valve 4 was closed and the valves 24 and 25 opened, steam was fed to the pressure vessel 1 through the pipe 10 and hence the mother liquor completely removed. The valve 24 was then closed and the valve 4 opened and, while more steam was introduced, the remaining mother liquor was removed from the filter cake 19 into the filtrate pipe 3. The total quantity of mother liquor was 16.2 kg.

To wash the filter cake 19, the pressure vessel 1 was filled with water at a temperature of 120° C., corresponding to a pressure of 1.96 bar, and the water forced through the filter cake 19 into the filtrate pipe. The residue left in the pressure vessel 1 was discharged through the pipes 14 and 21 and optionally 30, 14, 31, and 29. More water was then removed from the filter cake by introduction of air or nitrogen through the pipe 10 into the pressure vessel, a pressure difference between the vessel side and the pipe side of 0.5 bar being established at the valve 4. After adequate dewatering of the filter cake, air heated to 110° C. was then fed to the candle filters 2 from the inside of the filter cloth through the pipes 6 and 3, as a result of which the filter cloth expanded and the filter cake was blown off. The filter cake was then removed from the pressure vessel. In the above Example, 3.51 kg of filter cake having a moisture content of 42.7% = 1.5 kg MHEC pure/bone dry were obtained.

Balance 1.5 kg MHEC (bone dry, pure)
0.4% NaCl in the filter cake
42.7% residual moisture
16.2 kg mother liquor containing 4.3% NaCl and 0.17% organic C
17.0 kg washing water containing 1.6% NaCl and 0.13% organic C
Product loss including hemicellulose (calculated from organic C): 3.3% using pine cellulose with alpha=0.93.

Comparative tests showed that the described product cannot be worked up either in the laboratory at normal pressure or in centrifuges because it passes into solution on account of the high flocculation point.

With products having lower flocculation points and the same starting material, a product loss of about 14% occurred on working up in centrifuges.

Example II

A carboxymethyl cellulose (CMC) prepared in a solvent mixture of isopropanol (IPA) and water and having the following characteristic data:

| | |
|---|---|
| Brookfield viscosity of a 2% stirred mixture (CMC pure, bone dry; measurement temperature 20.0° C.) | 4,900 mPa.s |
| Degree of substitution: | 0.97 |
| Turbidity value (CMC pure, bone dry; 2% solution; Lange photometer, layer thickness 3.5 cm) | 4% | was adjusted by addition of more IPA/water to an alcohol content of 65% and to a mashing ratio of CMC (pure, bone dry): solvent/water of 1:15 in a closed, pressure-tight stirred vessel filled with nitrogen.

The pressure vessel 1 was filled with this suspension. Removal of the suspension liquid, removal of the residual volume and dewatering of the filter cake were carried out as in Example I, the pressure being adjusted to about 2 bar by introduction of nitrogen through the pipe 10.

Subsequent washing of the filter cake was carried with a 65% methanol/water mixture at 45° C. After nitrogen under 2 bar pressure had been applied to the filter cake, the filter cake was blown off by a surge of nitrogen pressure from the filtrate side at room temperature and the alcohol-moist cake removed from the pressure vessel.

Balance 1.3 kg CMC (bone dry, pure)
0.4% NaCl in the filter cake
48.3% residual moisture
15.6 l mother liquor containing 1.8% NaCl and 0.19% organic C
25.1 l washing alcohol containing on average 0.75% NaCl and 0.09% organic C The observed product losses including hemicellulose (calculated from organic C using pine cellulose with alpha=0.93) came to 4%.

We claim:

1. A process for the separation and purification of cellulose, cellulose ethers or cellulose derivatives in a pressure vessel equipped with candle filters, comprising feeding a suspension of cellulose, cellulose ethers and thermoplastic cellulose to said pressure vessel, introducing steam or gas pressure to the pressure vessel to form a filter cake of said suspension onto said candle filters, conducting the filtrate obtained at said candle filters out of said pressure vessel into a filtrate pipe, removing the residual mother liquor from said pressure vessel, feeding a washing liquid to said pressure vessel, introducing steam or gas pressure to the pressure vessel to remove said washing liquid from the pressure vessel and said filter cake, conducting the filtrate obtained into said filtrate pipe, removing said filter cake from said candle filters by introducing steam or gas on the filtrate pipe side, and recovering said filter cake from said pressure vessel.

2. A process as in claim 1 conducted at a temperature of from between about 15° C. and about 130° C. in said pressure vessel.

3. A process as in claim 1 wherein the filtrate obtained or excess suspension is recirculated to said pressure vessel.

4. A process as in claim 1 wherein said candle filters are covered with a filter cloth having a mesh width of less than about 100 μm.

5. A process as in claim 4 wherein said filter cloth comprises monofilament polyvinylidene fluoride having a mesh width of about 30 μm.

6. A process as in claim 4 including cleaning said filter cloth by introducing a cleaning medium to said candle filters under a pressure of from about 1 to about 5 bar on the filtrate pipe side.

7. A process as in claim 1 including removing water from said filter cake by introducing steam, hot air or nitrogen under pressure to said pressure vessel.

8. A process as in claim 1 wherein said washing liquid comprises water at a temperature of about 90° C. to 130°

C., or an alcohol/water mixture at a temperature of 15° C. to 60° C.

9. A process as in claim 1 wherein said step of removing said filter cake from said candle filters is performed with nitrogen at a temperature of about 15° C. to about 30° C. or air at a temperature of about 100° C. to about 120° C.

10. A process as in claim 1 including establishing a pressure of from about 1 bar to about 3 bar in said pressure vessel.

11. A process as in claim 1 including applying a brief surge of gas pressure to said candle filters from the filtrate pipe side to remove said filter cake from said candle filters.

12. A process as in claim 1 wherein said suspension contains methyl cellulose.

13. A process as in claim 1 wherein said thermoplastic cellulose comprises hydroxypropyl cellulose.

14. A process as in claim 1 wherein said suspension contains hydroxyethyl cellulose.

15. A process as in claim 1 wherein said suspension contains carboxymethyl cellulose.

* * * * *